Patented Jan. 31, 1933

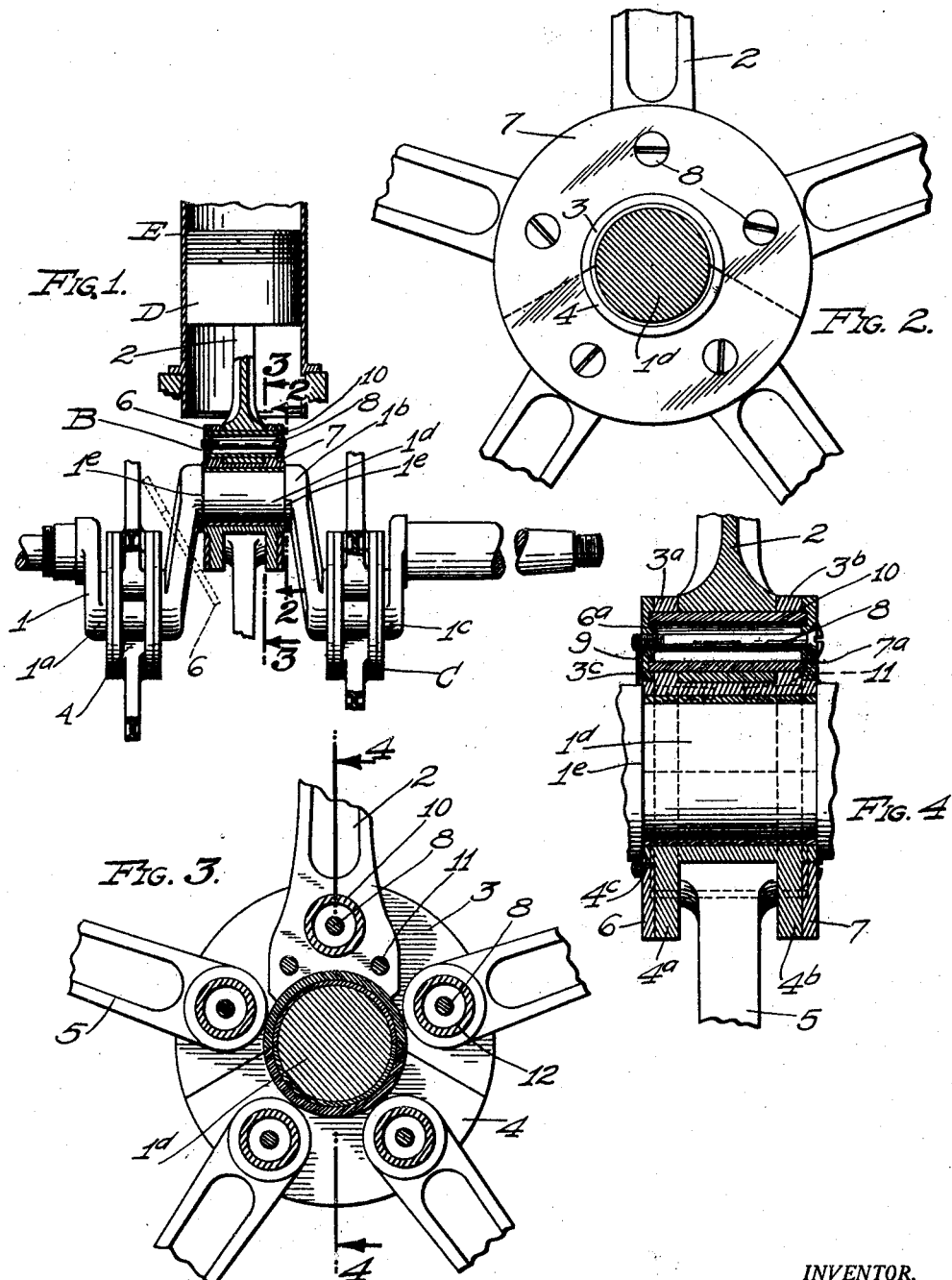

1,895,700

UNITED STATES PATENT OFFICE

LEE M. BOWMAN, OF LOS ANGELES, CALIFORNIA, ASSIGNOR TO DAWN MOTORS, LTD., A CORPORATION OF NEVADA

CONNECTING ROD CONSTRUCTION FOR RADIAL ENGINES

Application filed October 22, 1929. Serial No. 401,561.

My present invention relates to crank shaft and connecting rod construction primarily adapted for radial and rotary combustion engines, although not limited to such types of engines.

The objects of this invention are: first, to provide a connecting rod which may be easily connected to the throw of a crank shaft and which may be securely mounted thereon; second, to provide a connecting rod in which the crank shaft bearing is made of separate members rigidly connected together at their ends by plates extending across the joints between the separate members of the bearing and in which the plates take up substantially all of the load tending to force the separate members of the crank shaft bearing of the connecting rod apart, thus forming a connecting rod which is particularly adapted for a crank shaft made as a continuous and unitary member; third, to provide a connecting rod of this class in which the end plates of the crank shaft bearing thereof are annular plates rigidly holding the separate members of the bearing of the connecting rod together as a unit with a minimum number of screws or other means; fourth, to provide a connecting rod of this class in which the end plates encircle the end portions of the crank shaft bearing of the connecting rod, thus taking up at the central portion of the plates the greater portion of the load normally tending to separate the separate members of the bearing portion of the connecting rod; fifth, to provide a connecting rod of this class in which the end plates of the bearing portion of the connecting rod also retain the wrist pins, which pivotally connect secondary connecting rods to the bearing portion, in position; sixth, to provide a connecting rod construction of this class in which the wrist pins extend also into the end plates for directly supporting the wrist pins thereon, said wrist pins forming also secondary means for connecting the end plates to the members of the bearing portion of the connecting rod for holding the same together; seventh, to provide novel means for securing the end plates relative to each other and to the separate members of the bearing portion of the connecting rod; eighth, to provide a construction of this class in which ample and substantial connections are provided for secondary rods to a master rod; and one in which all of the secondary rods may be easily and quickly disconnected from the master rod; ninth, to provide a connecting rod construction of this class in which the master rod may be also readily disconnected from the crank shaft bearing thereof; tenth, to provide a connecting rod of this class in which the crank shaft bearing portion thereof is split and rigidly secured together by annular plates at the opposite ends of the bearing portion and a crank shaft which is so constructed that the annular plates may be readily placed in position by extending the same over one end of the crank shaft and around and over the several throw portions thereof; eleventh, to provide as a whole a novel crank shaft and connecting rod construction; and, twelfth, to provide a connecting rod of this class which is simple and economical of construction, compact, very durable, and which will not readily deteriorate or get out of order.

With these and other objects in view as will appear hereinafter, my invention consists of certain novel features of construction, combination and arrangement of parts and portions, as will be hereinafter described in detail and particularly set forth in the appended claim, reference being had to the accompanying drawing and to the characters of reference thereon which form a part of this application in which:

Figure 1 is a fragmentary sectional view of an internal combustion engine, showing a cylinder, piston and my crank shaft and connecting rod construction embodied therein; Fig. 2 is a side view on an enlarged scale, taken at 2—2 of Fig. 1; Fig. 3 is a sectional view also on an enlarged scale, taken at 3—3 of Fig. 1, and Fig. 4 is an enlarged sectional view taken at 4—4 of Fig. 3.

Like characters of reference refer to similar parts and portions throughout the views of the drawing.

The embodiment of my present invention is in an opposed piston radial internal combustion engine disclosed more fully in my copending application for Letters Patent for internal combustion engines, Serial No. 326,439, filed December 17, 1928.

The crank shaft 1 in this instance is a multiple throw crank shaft having throw or crank portions 1a, 1b and 1c to which are connected connecting rod mechanism A, B and C, respectively. The rod member 2 of the master rod of the connecting rod mechannism B is connected to a piston D which is reciprocally mounted in a cylinder E, the opposing piston in the cylinder E and the connections to the rod members of the master rod of the connecting rod mechanisms A and C not being shown.

The bearing portion of each of the connecting rod mechanisms A, B and C consists of a hub made up of two hub members 3 and 4. These members 3 and 4 are abutted on planes which extend from the median line of the hub at the opposite sides of the bearing portion 1d of the throw 1b of the crank shaft angularly outwardly, the abutting surfaces of the member 3 diverging outwardly and those of the member 4 converging inwardly, as shown in Figs. 2 and 3. It will be noted, however, that the abutting surfaces of the members 3 and 4 may vary as the number of secondary rods 5 is increased or decreased.

Each of the hub members 3 and 4 are provided with exterior flanges 3a and 3b, and 4a and 4b respectively. The flanges 3a and 4a and the flanges 3b and 4b form with each other annular flanges around the hub which are spaced from each other and also from the ends of the hub members, as shown in Figs. 1 and 4. These hub members are held in position with the abutting surfaces in abutting relation and with their ends against endwise movement by a pair of annular plates 6 and 7 which are preferably continuous annular plates positioned against the outer sides of the flanges of the hub members and around the portions 3c and 4c extending beyond the flanges. These plates 6 and 7 are secured together and to the outer sides of the flanges of the hub by a plurality of screws 8 which extend from one plate into the other between the flanges of the hub. These screws may be locked in position and against rotation by a wire 9 extending through holes in the threaded ends of the screws.

The rod member 2 which is a part of the master rod with the bearing portion just described is preferably a separate member which is removably but rigidly secured to the hub member 3 between the flanges thereof. As shown in the drawing, the rod member 2 is secured in position to the member 3 by a sleeve 10 extending through the rod and the flanges of the hub member around one of the screws 8. The rod member 2 is further secured in position to the member 3 by dowel or taper pins 11, as shown in Fig. 3.

The secondary connecting rods 5 are positioned with one end between the flanges of the hub members 3 and 4 and are pivotally connected thereto by wrist pins 12 which are preferably in the identical form of the sleeve 10 and are positioned around the other screws 8. Thus, the screws are placed in out of the way positions. The ends of the wrist pins or sleeves 10 and 12 extend beyond the outer sides of the flanges of the hub and into annular grooves 6a and 7a at the inner sides of the end plates 6 and 7 and are held in position by said plates. Thus, it will be seen that the wrist pins are also supported by the end plates and also that the wrist pins lock the flanges of the hub members to the plates, further securing the hub members together.

At the end of the cylindrical bearing portions 1d of the crank throws of the crank shaft are shoulders 1e which form thrust bearing portions which are engaged by the ends of the hub members extending beyond the flanges. The peripheral diameters of these thrust bearing portions are of smaller diameter than the extended ends of the hub members around which the end plates are positioned so that the end plates may be readily slipped onto and over the outer sides or peripheral portions of the thrust bearing portions of the crank shaft. The crank shaft is also so constructed that no portion thereof, at least from one end of the crank shaft, is of greater extent or cross section that the central openings of the end plates 6 and 7 so that the end plates may be readily slipped over the crank shaft to the desired position thereon preparatory to connecting the connecting rods thereto, as shown by dotted lines in Fig. 1.

By reason of the particular construction of the connecting rod mechanism as herein described, the crank shaft may be made continuous and unitary from end to end for rigidity, simplicity and economical construction.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention what I claim as new and desire to secure by Letters Patent is:

In a means of the class described, a longitudinally split hub having spaced apart annular flanges at its periphery, plates at the outer sides of the flanges for securing the separate members of the hub together, a master rod rigidly and removably secured to one member of the hub between the flanges thereof, and a plurality of secondary rods pivotally connected at one end to the hub between the flanges thereof.

In testimony whereof, I have hereunto set my hand at Los Angeles, California, this 28th day of September, 1929.

LEE M. BOWMAN.